(12) United States Patent
Rinzler et al.

(10) Patent No.: US 11,689,931 B2
(45) Date of Patent: Jun. 27, 2023

(54) SYSTEMS AND METHODS OF SECURING ACCESS TO MARKETING DATA

(71) Applicant: 1Q, LLC, Sandy Springs, GA (US)

(72) Inventors: Keith Rinzler, Sandy Springs, GA (US); Ryan Cino, Decatur, GA (US); Brian Scully, Marietta, GA (US)

(73) Assignee: 1Q, LLC, Atlanta, GA (US)

( * ) Notice: Subject to any disclaimer, the term of this patent is extended or adjusted under 35 U.S.C. 154(b) by 970 days.

(21) Appl. No.: 16/258,630

(22) Filed: Jan. 27, 2019

(65) Prior Publication Data

US 2020/0244511 A1    Jul. 30, 2020

(51) Int. Cl.
*H04W 12/12*  (2021.01)
*H04M 1/67*  (2006.01)
*H04L 9/40*  (2022.01)
*H04M 1/72463*  (2021.01)

(52) U.S. Cl.
CPC ............ *H04W 12/12* (2013.01); *H04L 63/14* (2013.01); *H04L 63/1466* (2013.01); *H04M 1/67* (2013.01); *H04M 1/72463* (2021.01)

(58) Field of Classification Search
None
See application file for complete search history.

(56) References Cited

U.S. PATENT DOCUMENTS

| | | | |
|---|---|---|---|
| 8,972,400 B1 * | 3/2015 | Kapczynski | G06F 16/13 707/732 |
| 11,055,727 B1 * | 7/2021 | Kumar | G06Q 30/0185 |
| 2016/0307191 A1 * | 10/2016 | Turgeman | G06Q 20/321 |
| 2017/0374076 A1 * | 12/2017 | Pierson | H04L 63/1408 |
| 2019/0332807 A1 * | 10/2019 | LaFever | H04L 63/0407 |
| 2020/0037140 A1 * | 1/2020 | Hassan | H04W 88/10 |

FOREIGN PATENT DOCUMENTS

WO    WO-2019154857 A1 *   8/2019   ............ G06F 21/62

* cited by examiner

*Primary Examiner* — Quoc D Tran
(74) *Attorney, Agent, or Firm* — Mehrman Law Office; Michael J. Mehrman

(57) ABSTRACT

The present disclosure comprises a situational awareness system comprising a range of security features. The method can comprise receiving, by a first wireless network device comprising a processor, identity data associated with a second device utilizing a telephone number of a telecommunications network. The method can also comprise determining by the first wireless network device that a fraudulent action associated with the telephone number has occurred, based on the received identity data. The method can further comprise preventing, by the first wireless network device, the second device from utilizing a mobile application associated with the telecommunications network, in response to the determining that the fraudulent action has occurred.

20 Claims, 6 Drawing Sheets

SYSTEMS AND METHODS OF SECURING ACCESS TO MARKETING DATA

TECHNICAL FIELD

The present disclosure relates to online situational awareness systems using location reporting mobile communication devices such as smartphones and, more particularly, to security features for the situational awareness system.

BACKGROUND OF THE INVENTION

Direct marketing is a $150+ billion industry, while market research and polling account for another $40+ billion each year. Increasing use of online commerce and social media creates new opportunities and presents new challenges for direct marketing and market research. Cost effective direct marketing and market research requires effective and efficient techniques for identifying the most appropriate target audience for each particular direct communication project and ensuring that the direct communication recipients actually read the polling or marketing information delivered to them. Properly identifying and motivating the target audience is often more important, and expensive, than locating raw address data to work with. While social media has experienced tremendous growth and contains a wealth of information concerning potential target audiences, direct marketing systems have not been developed to leverage this resource to advance market research and polling objectives.

Effective advertising and market research continue to be the keystones of a successful business. Despite continuing efforts to utilize online resources effectively, prior approaches to online market research and polling have been highly inaccurate with cost-prohibitive technical barriers preventing more accurate results. In addition, prior attempts to incorporate online resources into advertising have experienced very poor click-through and response rates. Existing technology for incorporating social media into market research and polling remains cumbersome and inaccurate. As a result, the current lack of affordable and effective direct marketing and research platforms presents a major barrier to entry for many companies, especially small and medium-sized businesses, which cannot afford to expend the vast sums necessary to reach their target audiences.

More generally, there is a further need for situational awareness of the demographic makeup and topical interests of people located in different geographic areas. This would allow very specific targeting and assessment of the size of targeted market segments before going to the expense of conducting promotional and market research activities. This type of situational awareness system would present useful information for a wide range of purposes other than advertising and market research activities. While this type of system can be extremely powerful, it also presents security concerns that could limit participation. These security concerns can, therefore, be addressed to prevent undesirable conduct and alleviate potential concerns that might otherwise inhibit members from providing access to their real-time location and profile data in order to participate in the situational awareness system. There is, therefore, a continuing need for a system and/or method for preventing unauthorized parties from accessing and/or corrupting market research and polling systems.

SUMMARY OF THE INVENTION

The present disclosure meets the needs described above in a situational awareness system comprising a range of security features. The method can comprise receiving, by a first wireless network device comprising a processor, identity data associated with a second device utilizing a telephone number of a telecommunications network. The method can also comprise determining by the first wireless network device that a fraudulent action associated with the telephone number has occurred, based on the received identity data. The method can further comprise preventing, by the first wireless network device, the second device from utilizing a mobile application associated with the telecommunications network, in response to the determining that the fraudulent action has occurred.

Another embodiment of the disclosure can comprise a system comprising a processor and a memory that stores executable instructions that, when executed by the processor, facilitate performance of operations. This method for the operation can comprise receiving identity data associated with a mobile device of the wireless network, in response to transmitting a telephone number of a wireless network to a server. The method can also comprise determining that a fraudulent action associated with the mobile device, has occurred, in response to the receiving the identity data. The method can further comprise preventing the mobile device from utilizing an application of the mobile device, in response to the determining that the fraudulent action has occurred.

In yet another embodiment, the disclosure can comprise a machine-readable storage medium. The machine readable medium can comprise executable instructions that, when executed by a processor, facilitate performance of operations. The method of the operations can comprise receiving identity data associated with a device utilizing a telephone number of a telecommunications network. The method can comprise determining that a fraudulent action associated with the telephone number has occurred, based on the identity data. The method can further comprise performing a responsive action associated with limiting utilization of a mobile application associated with the telecommunications network, in response to the determining that the fraudulent action has occurred.

In view of the foregoing, it will be appreciated that the present disclosure provides improved security features for a situational awareness system. The specific systems and techniques for accomplishing the advantages described above will become apparent from the following detailed description of the embodiments and the appended drawings and claims.

DETAILED DESCRIPTION

Figure 1:
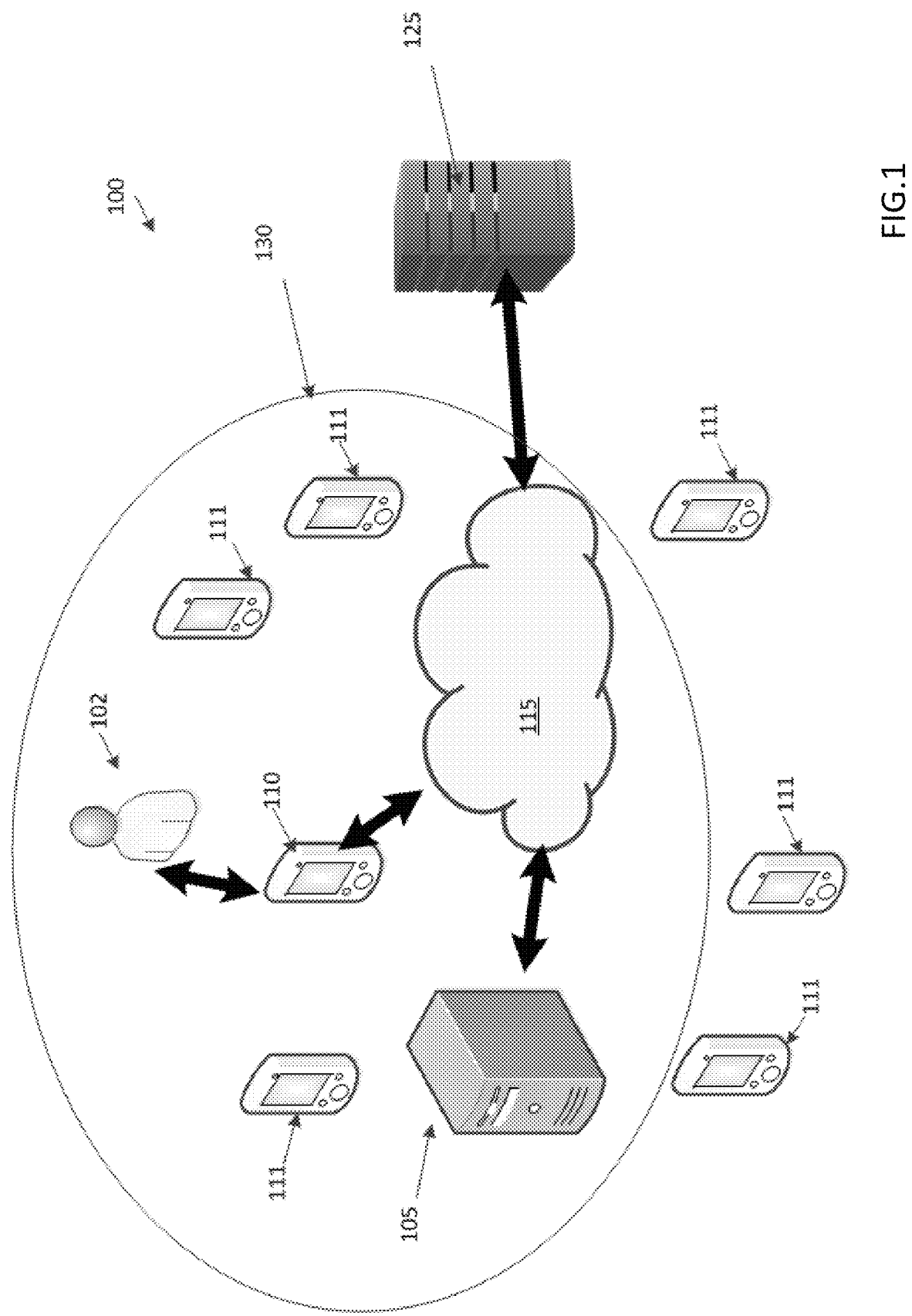
FIG. 1 is a conceptual illustration of a situational awareness security system.

Providing an assessment of personal data statistics and subject matter of interest statistics for the general population in a particular geographic area based on the situational awareness information for system members in that particular area can be a very effective tool for an advertiser. That information can be effectively used, for example, when purchasing print, direct mail, radio, television, online or other types of communications directed to the general population in that geographic area. For example, an analysis indicating that 60% of the system members in a particular geographic area meet a particular personal data or subject matter of interest criteria (e.g., income level) can be considered to be a good indication that a similar proportion of the general population in the geographic area meet that criteria.

An instant response system can be a compensation driven, permission-based marketing and polling system that utilizes per member query compensation, social media interfacing and dynamic polling to produce desired personal data results with the minimum number of member requests. The instant response system can be used for a wide range of objectives, such as direct marketing, market research surveys, polling, focus groups and any other marketing or research objective relying on bulk responses to direct member communications. The description of the system refers to online queries (also referred to as surveys or polls) as an illustrative application of the technology. It will be appreciated that the system can be readily adapted to other direct response objectives by changing the content of the member communications.

The instant response system can be permission based through a membership system in which members agree to participate by providing short turn-around anonymous responses to online queries in exchange for per-response compensation. Customers utilize the instant response system to conduct online queries of the members in exchange for a per-response compensation. The provider of the instant response system can earn the difference between the compensation received from the customer and the payments made to the member as compensation for operating the instant response system.

For example, the customers can pay two dollars for each response received, while the members can be paid one dollar for each response provided. While other types of fees and payments can be utilized, the per-response compensation model is easy to understand and has been found to be highly effective in motivating participation by both members and customers on a basis that is transparent and easily measured and tracked by all involved.

Members of the instant response system can provide permission to access their profile data (also referred to as personal identity attribute data), which can comprise real-time location data through access to their social media profiles. Alternatively, member profile data can be stored in an instant response profile maintained by an app loaded onto their smartphones. Members can be encouraged to provide access to their profile data and increase the detail of the personal data and subject matter of interest comprised in their profiles in exchange for earning compensation by participating in online queries. The situational awareness system can affirmatively prompt members to increase the detail in their data profiles, participate in online queries and provide location data in order to improve their query priority and thus, increase their ability to earn compensation by answering queries. Members can retain their compensation or designate a charity to receive the compensation earned by responding to online queries.

In order to participate in the compensation system, each member can enter into a marketing participation agreement and provide the system operator with personal data (profile) information about the member, such as age, address, education, family, income, purchasing preferences, and so forth. The member can be encouraged to provide greater levels of personal data and subject matter of interest data to increase the likelihood they will be selected to participate in online queries. While membership questionnaires can run the range from basic to highly involved, the system can request a bare minimum of information, such as the member's name and phone number, along with authorization to obtain additional member profile information from their social media resources, such as Facebook®. Members can also authorize access to and utilization of information about the member from public resources, such as Equifax®. Members can be encouraged to enter advanced personal data information into their social media resources and can, for example, create a section specifically designed to contain member supplied information intending that information to be used to determine their suitability and desire to be included in online queries relating to different areas of potential inquiry.

Advanced personal data and subject matter of interest profile data can comprise information such as professional information, areas of professional interest, areas of recreational interest, areas of expertise, hobbies, family information, political affiliations, associations, automobiles, vacation locations, preferred reading materials, major products or services recently purchased, major products or services they intend to purchase in the near future, health information, etc. The member's profile information and online query responses can be kept strictly confidential unless the member specifically authorizes disclosure. This personal data information as well as their prior online query response history can be used to anonymously target the member for online query participation. Members are, therefore, motivated to provide higher levels of personal data and subject matter of interest information to increase the likelihood that they will be selected to receive online queries based on the profile data provided. The personal data and subject matter of interest data can be contained in a member profile stored as part of the instant response system, where it can be used to target the member as an online query recipient. In this manner, the instant response system can accumulate a great deal of personal data information about its members while simultaneously obtaining authorization to use this information for online queries, targeted promotions and market research purposes.

Members are also encouraged to allow the system operators to automatically post, whenever the member receives compensation, on their social media resource. Although the fact of compensation is considered to be an effective posting, additional compensation related information can be automatically posted if desired, such as the amount of compensation, the number of online queries, the duration of membership, and so forth. Members can also authorize advanced features such as "friend tracking" and "location tracking" so that the number of friends on their site and their geographical location can be used as online query selection criteria. The member can also authorize an online query compensation "hot link" to the instant response system where the amount of online query compensation paid to the member is continually updated by the instant response system. Posting the fact of the member's participation in the system and member's online query compensation on social media can provide effective advertising for the system provider to motivate others to join as members. These and other social media factors can be tracked and used as ranking parameters to increase the member's priority as a potential online query recipient, thereby increasing the member's income potential through online query participation.

The system can utilize a dynamic polling algorithm that allows the online query results to satisfy online query constraints and very closely match target personal data defined by an online query request with a minimal number of online query responses. The dynamic polling algorithm allows the online query to "hone in" on the desired personal data results with a minimal number of online query requests by: submitting the requests to members forming the target audience in a priority order, computing the residual target personal data as online query results roll in, and continually adjusting the target audience to match the residual target personal data as the online query progresses. This allows the system to iteratively narrow the target audience to those members having the increasingly precise personal data needed to meet the target personal data as the online query progresses toward completion.

While dynamically converging on the target personal data as described above, the system can rank the members in a priority order for inclusion in the online query using a number of weighting factors that take a number of factors into consideration in the weighting process. The weighting factors can comprise a number of "system factors" that are considered beneficial to the system operator by encouraging membership growth and participation, along with a number of "customer factors" that are considered beneficial to completion of the online query with a minimum of requests by closely matching the target audience to the residual target personal data. The weighting is progressively shifted from system factors to customer factors as the online query progresses to meet both sets of objectives while fulfilling the online query request with a minimum number of online query requests.

The system can produce categorized, online queries with multivariate relationships. Every poll specifies a number of personal data categories with defined criteria. To provide a simple example, a particular online query can specify age, geographic region, and ethnic race as personal data categories, with each category defining four criteria. A poll without multivariate relationships requires only that the overall online query results meet these personal data criteria. Multivariate relationships, on the other hand, specify the personal data results for the criteria within each category. Expanding the preceding example into a multivariate example, each "age" category has its own personal data complex of geography and race factors, each "geography" category has its own personal data complex of age and race factors, and each "rage" category has its own personal data complex of age and race factors.

Conducting a poll to closely match target personal data with multivariate relationships is extremely challenging because the interrelating criteria result in a giant jigsaw puzzle requiring, for example, 5000 online queries to obtain the "right" 1000 responses that match the multi variate relationships of the target personal data. There are no polling systems currently available that are designed to produce poll results that closely match target personal data with multivariate relationships. To meet this challenge, the system can comprise a dynamic polling algorithm that matches target personal data with multivariate relationships within a defined margin of error, or presents the best available results, though the dynamic polling procedure. For example, the system can alert the customer, and provide the best available response, when the member database is simply not large enough to precisely match the multivariate personal data makeup of a national poll for a country of interest within the desired margin of error. In addition, the system can alert the customer, and provide the best available response, when an attempt to converge on a specific multivariate personal data makeup, within a specific margin of error, reaches a specified maximum online query time or number or responses.

One of the unique aspects of the instant response system is the ability of members and customers to learn "situational awareness" information about other members around them without knowing specifically who those people are. Customers can utilize a menu-driven system to gain situational awareness by identifying target member segments and receiving situational awareness information about the target member segments. Target member segments can be defined by specifying one or more of a geographical area of interest, a personal data profile of interest and a subject matter area of interest. The system can identify members corresponding to the target member segments and displays situational awareness data, such as personal data statistics for the target member segment, to the customer. The situational awareness data can be displayed on a graphical representation of the geographic area of interest, typically superimposed on an underlying map. The customer can then create and broadcast promotional offers or online queries to the target member segment in accordance with selected query parameters. Customers can pay for the promotional offers and online queries, and member's receive compensation for answering the queries, on a per-response basis. Providing the customer with situational awareness information prior to issuing a query can allow the customer to assess the size of a very tightly defined target member audience and set query parameter s prior to issuing any promotional offers or online queries.

Customers can utilize member profile data to identify and qualify members for participation in promotional offers and online queries based on one or more of real time location, personal data and subject matter of interest data fir the members obtained from their member data profiles, which can be continually updated social media profiles. Customers can be encouraged to conduct market research through the situational awareness system to obtain online query results through highly targeted member audiences at greatly reduced costs compared to conventional market research techniques. Fully menu-driven member enrollment, customer enrollment, target member segment definition, online query implementation, result reporting, and automatic payment features allow the member and customer base of the situational awareness system to, grow autonomously (and potentially virally) without interaction by a human administrator on a member-by-member, customer-by-customer, or query-by-query basis.

Ongoing successful deployment of the situational awareness system can result in a large and constantly growing membership base that provides permission-based, real-time access to member profile data including geographic, personal data and subject matter of interest data for a large database of participating members. Members who are interested in earning compensation through the situational awareness system have a financial incentive to activate location tracking and provide highly detailed profile data that customers can use to direct highly targeted online queries and promotions to members with very specific personal data and subject matter areas of interest. These members have a similar financial incentive to provide location awareness, typically through online access to their social medial location feature, in order to receive geographically targeted online queries. For example, members at a sporting event can provide their real-time location data to the situational awareness system, and potentially indicate their team preference in their social media profile, in order to receive online queries and promotional offers directed specifically to fans of said team at the sporting event. Since the audience is highly targeted, sponsors can be expected to be able to afford more lucrative promotions. Online queries about the desire for future tickets, booster events and fan clubs can then be directed to a highly qualified specific target member segment. Promotional offers can likewise be directed to the target member segment, such as discounts for future ticket sales, season ticket discounts, team clothing offers, post-game dining coupons and so forth.

The instant response system working with member devices providing geographic location data can be used to provide situational awareness concerning members in a particular geographic area of interest regardless of whether the system is also used to send online queries or promotions to such members. Moreover, once a rich database of situational awareness system members has been developed, the membership can be utilized as a representative sample of the public at large. This provides opportunities for customers to glean generally applicable geographic, personal data and subject matter of interest awareness from the data provided by those members that have authorized access to their profiles. Situational awareness can, therefore, be highly useful regardless of whether promotions or online queries are also transmitted. For example, a member looking for a sports bar can quickly find out if the patrons in a particular establishment are predominantly fans of one team or another. As another example, a member looking for a nightclub can quickly glean an indication of the age profile and male-to-female ratio for patrons in a particular establishment. Similarly, a customer interested in conducting a direct-mail campaign can quickly identify zip codes with desired personal data characteristics. The situational awareness system can also be used to revolutionize political polling, improve television ratings, provide similar ratings for online, entertainment resources, track medical patients, track and locate lost children or members of other groups, communicate with product purchasers, facilitate meet-up groups, track and communicate with, members of specific groups. Online queries and other types of location-based services, such as: promotions, chats, meet-ups and so forth can then be leveraged from the geographic, personal data and subject matter of interest awareness provided by the situational awareness system.

Geographic, personal data and subject matter of interest awareness is accomplished using geo-location technology where a customer or member can set a geographic boundary to identify all members of the situational awareness system within a certain geographical area, such as radius of 1000 feet of where they are standing. Other types of geographic areas of interest can be a selected political subdivision (e.g., state, city, county, zip code) or a selected type of establishment (e.g., a stadium, restaurant, office building, etc). These geographic definitions can also be combined to define compound geographic areas of interest, such as members on "golf courses in the state of Tennessee"; members in "national parks in the state of Maine"; members in "night clubs in Chicago" and so forth. The requester can also specify personal data criteria, such as gender, age category, education level, employment status, income level, etc. Subject matter of interest information can comprise detailed social media criteria, such as sports team preference, hobbies, age of children, type of automobile, and the like. This combination of geographic, personal data, and subject matter of interest criteria allows a target member segment to be defined and fine-tuned with a great deal of specificity.

A requester can also specify a particular subject matter of interest for online queries, such as political election subject matters, health and fitness subject matters and so forth. Member participation in online queries can require interested members to "opt-in" to limit query distribution to members that are (a) qualified based on geographic and personal data criteria, (b) have indicated an interest in responding to online queries on the particular subject matter of interest in exchange for the designated compensation, and (c) meet certain security criteria. This greatly increases the efficiency and effectiveness while reducing the cost and imposition of unwanted online communications on members who are not interested in participating.

Obtaining geographic, personal data and subject matter of interest awareness, can be a free component provided as a benefit to registered members and customers configured to occur prior to the payment screen required for online query or promotion distribution. This allows a customer or member to be charged if they send a message to the target member segment, which can be further limited to an opt-in member segment meeting certain criteria who have also authorized (opted-in) online queries on the specific subject matter of interest. As the situational awareness system grows to the point where the membership becomes generally ubiquitous and representative of the population in general, situational awareness becomes a truly revolutionary form of social networking offering the capability to know detailed information about the people who surround you without knowing who, specifically, they are.

The opportunities for this type of situational awareness system are extensive and far reaching, ranging from individuals trying find recreational venues, to companies trying to find potential customers, and political parties trying to identify potential voters to provide just a few illustrative categories of applicability. As a specific example, a patron in a sports bar can find out how many Buffalo Bills fans there are within 50 feet of where he is standing. A speaker at a conference could find out what percentage of his audience has household incomes above $250,000. Before leaving home, someone can find out the approximate male/female ratio at two different nightclubs they are considering visiting. Where there might be data missing or the sample set cannot be large enough, location-based services can be used to fill in the gaps. For instance, although everyone on a golf course cannot be a member, if they are on the golf course, it is a good bet that they are a golfer. Furthermore, a historical database member location and other profile data that have visited a particular nightclub over a previous period of time can also be used or searched to help determine a personal data where live data cannot be conclusive. Therefore, an indication that there is a mobile device in a specific area (e.g., on a golf course) can further provide data about a specific personal data. Furthermore, there could be members who are currently on a golf course but who have not self-identified as golfers or their social media profiles do not identify them as golfers. In this scenario, the aforementioned members could be listed as a golfer or labeled with a high probability of being a golfer when an online query comes in for all persons who are golfers and who are actually on/near the golf course. Therefore, as the database of available member profiles grows, so does the ability to learn various information about a geographically defined populous.

Additionally, a member could set their smartphone to vibrate or other type of notification any time they are within a specific distance of any segmented group. For example, a member could set his phone to notify him when he is within a certain range or number of people who work for the same company, belong to the same meet-up group, have children in the same school class or play on the same sports team, have a common medical condition, have read "Fifty Shades of Gray," or have any other personal data or subject matter of interest criteria reflected in the profile data of members of the system. As a security measure, requesters can only be provided with situational awareness data for groups in which they are enrolled. As another feature, the data query radius can be static or dynamic. A static query can say, please tell me how many persons are "Fifty Shades of Gray" fans within a 10-mile radius. A "reverse query" feature can also be configured to return an answer to a query such as "find the radius of the closest 100 Denver Bronco fans."

In another embodiment, the payment and incentive can be more granular. For instance, a first member who walks into a building can send an online query to determine "who are the active stock market investors in this building." A second member who is an active stock market investor currently located in that particular building receives a ping that says "there is a request for active stock market investors, would you like to opt-in to receive online queries directed to active stock market investors, yes or no?" If the second member answers "yes," then his or her social media profile or direct contact information can be presented to the first member along with an option to pay to send a specific online query or other inquiry (e.g., promotional offer, invitation for a consultation) to the second member. The first and second members can also be prompted to activate a "chat" session to communicate directly with each other.

In another embodiment, a ping could only be sent to members when a mutually beneficial relationship exists. For instance, if a first member is a lawyer and is looking for an investor, and a second member is an investor and is looking for a lawyer and they are within a predefined geographic radius of each other, then they both will receive a ping simultaneously to perform an ad hoc consultation for each other. In this scenario, both members can have to pay compensation to actually receive the profile information of the actual individual who they are requesting to meet. However, other payment options and scenarios can be available to facilitate the transaction.

In yet another embodiment, the system can help people to self-identify where they have not done so previously. For instance, a member can send out a poll wanting to know "who are the males between the ages 25-27 that like dogs within a 5-mile radius." The system can then determine which other members meet that criteria. However, if a lower than expected number or no results are returned at all, yet there are definitely males between the ages of 25-27 within the 5-mile radius who have not self-identified as dog lovers, it can be possible to send the identified males a follow-up question to solicit the needed info. In this particular scenario, the follow-up question to males between the ages of 25-27 within a 5-mile radius would say, "do you like dogs"? Based on their responses, the system has helped some of the males to self-identify so that the member requesting the data will have a good sample set. The system can also prompt those who self-identify as dog-lovers to comprise this information in their profile data. If the system enters this data into the member's profile or otherwise receives an indication that the member has updated their profile, the system can increase the member's online query priority to increase the likelihood that the member will receive online queries and promotions. The increase in online query priority can apply to the member generally or specifically for online queries and promotions related to dogs.

The situational awareness system can also assist in building subject matter of interest profiles for members using location tracking information. Members who participate in the system activate location tracking on their mobile devices and provide the system with real-time access to the location tracking data. The situational awareness system analyzes a member's location tracking data, detects potential subject matters of interest for the member based on the location tracking data, and then prompts the member to update their profile data to comprise the detected potential subject matters of interest. If the member adds a suggested subject matter to their profile, the situational awareness system comprises the member in situational awareness information provided to requesters seeking information concerning members interested in the added subject matter. The situational awareness system can also direct online queries to the member relating to the added subject matter and increase the member's priority for participating in online queries. The member has a financial incentive to authorize location tracking and add subject matters of interest to their profile in order to increase their ability to earn compensation by participating in compensation-based online queries.

It should be noted, that along with the ability to determine specific sets of persons based on their location, personal data and subject matter of interest information, there will inherently arise a need for security governing the use and inclusion of such information in situational awareness information provided to third-party requesters. To minimize nefarious activity, certain parameters or restrictions can be placed on how and what type of information is obtained. For instance, a mother can want to know how many children between the ages of 9-12 are on the playground so that she can decide to take her 10-year-old child there if the age personal data aligns with the age of her child. However, a pedophile can want to use the same information for nefarious reasons. There are several ways to address the above situations. To combat the potential problem, the system aligns certain data points to mitigate nefarious activity. For instance, if the request for the number of 9-12 year olds comes from a person outside of a specific age bracket, then the request can be denied. In this instance, the request will be denied because the mother is not within the age bracket of 9-12. However, if the request came from her child or the child's mobile device, the request would be granted because he is of the personal data for which information is being requested. The child's age could possibly be confirmed via biometric data associated with his mobile device. An additional layer of security can utilize biometric data. For instance, in the above-noted example the 10-year-old is able to determine a specific personal data related to children who are between the ages of 9-12 because he is of that personal data, therefore, biometric information can be used to confirm that the 10-year-old is actually of the personal data which he is querying. The biometric data can comprise fingerprints, retina scans, digital photographs, etc. The situational awareness system compares biometric data received from situational awareness requesters to verified biometric data stored by the system to prevent unauthorized access to situational awareness information.

In another embodiment, the information might be restricted altogether, meaning that it would never be appropriate to provide data on anyone below the age of 15. Alternatively, external data can be used to reconcile the information to determine if providing the information is appropriate. For instance, a pedophile has to register with the local government agency under a disclosure law. This information would then be sent to or pitied from external sources (e.g., public offender database, social media) so that personal data information of anyone under the age of 21 is never presented to a registered pedophile.

In another embodiment, the system can leverage maximum and minimum data for security measures. For instance, a user in a room with only 3 other users can check the system to determine how many people within 10 feet of him are Republicans. Because the system can set a mandatory minimum for certain sensitive data points, the query can come back as null or not enough persons. The minimum can require that there be at least 10 people present for this type of data to be divulged. However, there could also be an end-around where the 3 other users have indicated that they do not care if anyone specifically knows they are Republicans. Therefore, if all 3 users or some subset of the users have waived their right to this security measure, then the info can be presented to the user who has requested it. Additionally, a member can be super secretive about their party affiliation and feels that even with the 10-person minimum, there are still too few people in the room for him to feel comfortable and he would like the minimum to be no less than 15. In this scenario, the member can have the opportunity to store this type of data as a part of his profile, so that if the situation ever arises, instead of the system, defaulting to the 10-person minimum, the system will go to a 15-person minimum, thereby facilitating a higher level of protection. The system can have the ability to accept the highest level of protection requested by any user in a group of users, extrapolate any outliers, or average the requested protection levels. In the case of an average, the system can indicate such to the persons with a security protection level higher than that of the average so that he/she will know that the defaulted security level is less than what he/she anticipated.

Additionally, the system can suggest polling parameters in response to an indication that certain information is restricted due to security reasons. For example, if a member requests to know all of the persons within a 10-foot radius that are Democrats and there are only three members in the room and there is a security minimum of 10, then the system might suggest that the requestor expand his search area to a 30-foot area where the system has already determined that there are at least 10 Democrats within the 30-foot range.

A member can also choose to go into stealth mode by limiting the information that is available about them based on a specific geographic location, time of day, etc. For instance, a member's profile can list that she is a Falcons fan, but because she works for a company that does a lot business with the Dallas Cowboys she can go into stealth mode from the hours of 9 am-5 pm when she is on business travel in Dallas. Therefore, when she is in the presence of the Dallas Cowboys, they cannot poll to determine or verify that she is indeed a Falcons fan.

FIG. 1 is a conceptual illustration of a situational awareness system 100, which can be implemented as an aspect of the previously described instant response system. The system allows a requesting device 110, typically associated with a customer (user) 102 of the instant response system, to submit a "situational awareness request" and in response receive "situational awareness information" about other members 111 within a target member segment 130 defined by the situational awareness request. In another aspect, a user 102 can also be a member based on the particular situational awareness request. The situational awareness request comprises one or more of geographical, personal data and subject matter awareness information defining the target member segment 130. The devices 110, 111 used by the user and members can comprise a mobile device, smart phone, general purpose computer, tablet, computer, laptop computer, smart wearable device, voice command device, or any other, device cable of communicating with the network 115.

The data representing the target member segment 130, such as personal data statistics, can be presented to the requester on a geographic representation of the geographic area of interest defined by the request. The situational awareness information is typically provided anonymously by providing personal data statistics of the target member segment without divulging the identities of the individual members of the target member segment. The identities of specific members; the ability to send online requests to specific members; and/or the ability to communicate directly with specific members can be granted with the "opt-in" consent of the specific members of the target member segment.

To illustrate a non limiting example, a situational awareness request submitted by the requesting device 110 to a situational awareness server 105 can identify a geographic area of interest 130 defined as a radius around the current location of the requesting device. Each member profile participating in the situational awareness system is represented by the mobile devices 111 shown within the area of interest 130. To participate in the situational awareness system 100, these devices are activated to provide location data to the situational awareness server 105. The server 105 can have one or more processors and one or more databases along with the functional capabilities to communicate to the network 115 wirelessly or hard-wired.

Each member device 111 is associated with a member profile that comprises personal data and subject matter of interest data for the corresponding member. The geographic location, personal data and subject matter of interest member profile data is stored in the member's social media data or in an instant response application (app) running on the member's device 111, such as a smart-phone. In addition to the geographic data defining the geographical area of interest, the situational awareness request submitted by the requesting device 110 comprises personal data of the member. The personal data can comprise a personal data profile and subject matter of interest data. The target member segment corresponding to these criteria can be identified by comparing the member profile data for all of the participating members within the area of interest 130.

The situational awareness server 105 can present the requesting device 110 with situational awareness information, which can comprise personal data statistics representing the member profile data compiled from each of the members through their devices 111 in the geographic area of interest 130. The geographic area of interest 130 can also correspond to a political subdivision, such as a country, region, state, county, city, zip code and the like. The geographic area of interest 130 can also correspond to one or more establishments, such as a stadium, office building, golf course, and so forth. These criteria can so be combined, for example to specify all office buildings in a particular zip code.

The situational awareness server 105 can serve as a central processor of the system 100, while each member and user 102 only needs a mobile device to communicate with the server. Each member and user device typically utilize an application (app) downloaded onto their respective device, although member devices can be configured to participate using only a standard browser, text functionality, and access to the menthol's social media profile. Member devices provide profile data, which comprises geo-location data to participate in location-based situational awareness services, on a permission basis. The member's profile data can be stored in a social media profile or the instant response app, which is specially configured to store detailed personal data and subject matter of interest data to enhance the member's ability to participate in the instant response system.

The data can be communicated through the network 115. The network 115 can comprise the interact or world wide web. In other embodiments, the network can be a cloud computing atmosphere. In another embodiment, the network 115 can comprise one or more private and/or public networks that use various communications technologies and protocols to send and receive information between components of system 100. The network 115 may facilitate communication through connections such as radio frequency identification, near-field, Wi-Fi, USB, WAN, LAN or any combination thereof.

The situational awareness server 105 can provide a wealth of functionality that members and users can access on a menu-driven, self-service basis including, but not limited to, members and user enrollment, situational awareness, online query submission, statistical and display analysis of online query results, members and user instant compensation, dashboard graphical display with map overlays, report generation, member profile data collection and analysis, location tracking, member communication for opt-in situational awareness and online query participation, member profile development, opt-in chat and other types of direct contact and a range of security features.

Figure 2:
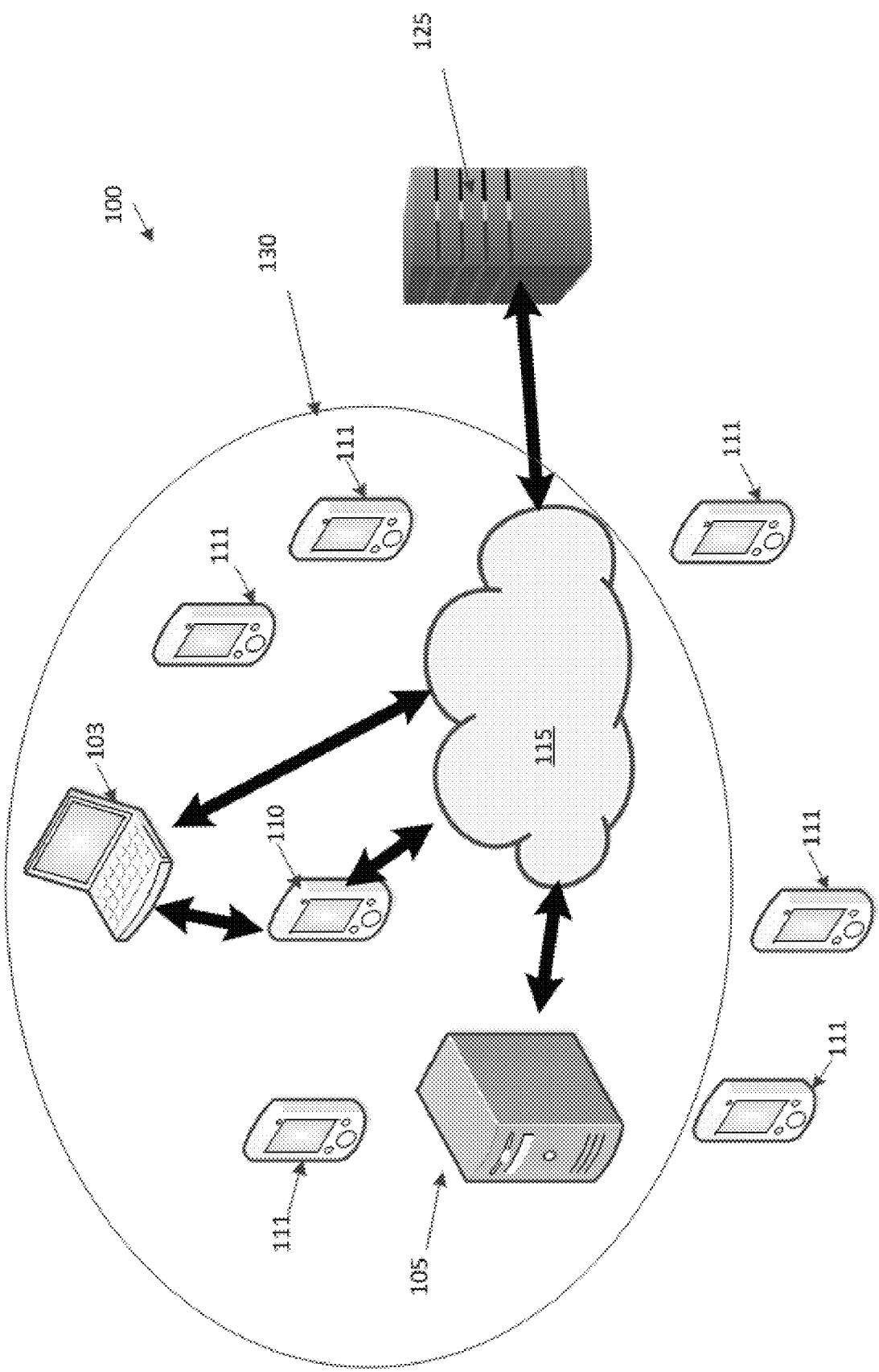
FIG. 2 is an alternative embodiment of a situational awareness security system depicting fraudulent use.

The user device 110 can be identified by a unique identifier. For example, the unique identifier of the user device 110 can be a telephone number, IP address or piece of profile data provided by the user 102. In an alternative example, as shown in FIG. 2, a secondary computing device 103 capable of communicating through the network 115 could run instructions to send requests through the user device 110. In another aspect, the secondary device 103 could communicate directly to the network 115 in the absence of a user device 110. The alternative example in FIG. 2 depicts a potential configuration resulting in fraudulent activity, such that the secondary device 103 attempts to make requests upon the server 105. For example, the secondary device 103 can be running a protocol that initiates a phishing scam upon the server 105 to gain access to member 111 profile data. Thus, to secure and preserve the integrity of the system 100, the situational awareness server 105 can implement procedures against fraudulent users who may have invalid profiles. Examples of fraudulent activities can comprise using a robotic aliases; providing false answers (i.e. just choosing first answer choice every time) or using a false identity (birthdate, name, address, etc.). Another fraudulent activity example can comprise using the same identity or profile to access multiple accounts in the system. The situational awareness server 105 can seek to limit the access of the fraudulent user 103.

In a further aspect, the situational awareness server 105 can provide the unique identifier, such as a telephone number or IP address, associated with the user profile to a third-party 125. For example, in certain instances, validation of the identity the user device 110,103 is associated with the telephone number. This telephone number can be the unique identifier where a validation can be completed by a third-party company, such as Telesign. In another example, when communication by the user device 110, 103, is directly through the internet, in the absence of a telephone number, validation of an identity associated with IP address can be completed by a third-party, such as MaxMind.com. After the verification assessment, the third-party can send data associated with the telephone number or IP address back to the situational awareness server 105. At that point, a further determination can be made by the situational awareness server 105 to allow access to the user 102 through the respective device 110, 103. In another aspect, the unique identifier security features can comprise requiring a security identifier, such as a password or a bio identifier that is validated by the third-party 125 or the situational awareness server 105.

Figure 3:
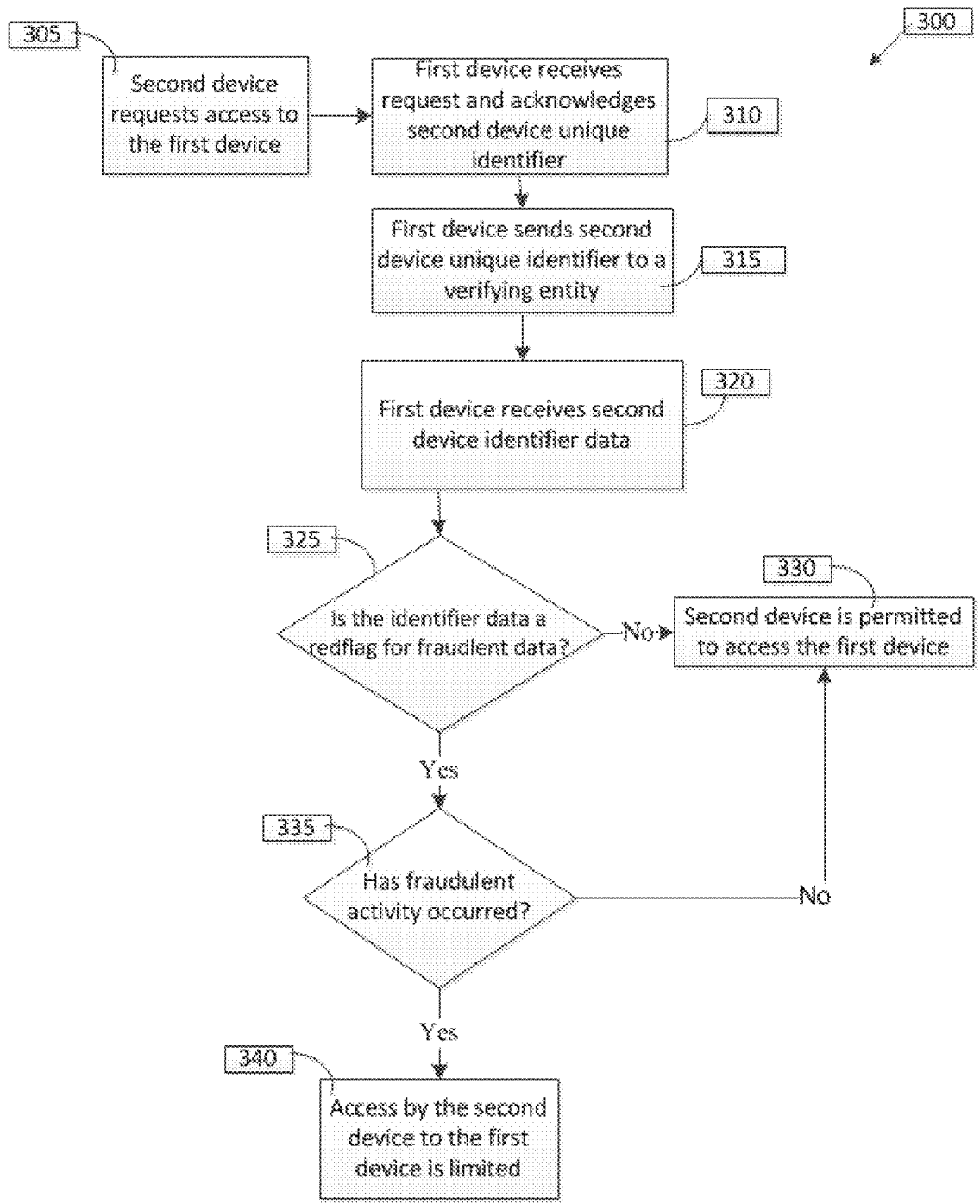
FIG. 3 is a logic flow diagram for providing security when deciding whether to provide access to a requester from a device.

FIG. 3 is a flowchart representing an example method for securing and protecting marketing and polling systems through the system 100. The method 300 can begin at block 305 in which a second device (e.g., user device 110) can request access to the system 100. Block 305 can be followed by Block 310 in which a first device (e.g., situational awareness server 105) receives a request from the second device 110, 103 and acknowledges a unique identifier.

Block 310 can be followed by Block 315, wherein the first device can send the second device unique identifier to a third-party verifying entity 125. For example, the verifying entity can be a separate server or third-party wherein the unique identifier of the second device can be used to verify the identity of the second device. In another aspect, the identity verification can be completed by the first device.

Block 315 can be followed by Block 320 wherein the first device can receive a second device identifier data from the verifying entity. For example, the data received from the verifying entity can provide additional details associated with the second device identifier (telephone number). Further, these details can comprise, but not be limited to the address owner, the type of device associated with the number. Block 320 can be followed by the Decision Block 325 wherein a determination of whether the identifier data is a red flag for fraudulent data.

If it is determined in the Decision Block 325 that the identifier data is not a red flag for fraudulent data, the No branch can be followed to Block 330, and the second device can be permitted to have access to the system. Referring back to the Decision Block 325, if the identifier data is determined to be a red flag for fraudulent data, the YES branch can be followed to Decision Block 335. At Decision Block 335, a determination is made whether the second device is committing fraudulent activity. For example, in determining whether a fraudulent activity has occurred, an assessment can be made based on the profile data provided by the user 102. In a further aspect, the system can make a determination of the type of assessment to be made. In yet another aspect, the data received can determine the type of assessment used by the server.

If it is determined in Decision Block 335 that fraudulent activity has not occurred, the NO branch can be followed to Block 330 wherein the second device is permitted access to the situational awareness server 105. After a determination of the type of profile assessment by the situational awareness server 105, the situational awareness server can further establish threshold parameters to determine if the responses to the assessment qualify as a validated assessment. For example, in one aspect a keystroke analyzer can be used. In particular, a sequence of entries can be requested by the situational awareness server 105, wherein the user 102 can be required to provide a specific set of responsive entries that conform to syntax, character, alphabetical, and/or grammatical norms (e.g., coherent text that has a meaning relative to the questing being responded to). In a further aspect, for the requested sequence of entries to be validated, the situational awareness server 105 can require that the entries be provided in no less than a predefined period of time, such as 5 or 10 seconds, etc. For example, an adequate and/or cohesive response to the requested entry should take no less than 10 seconds. If the response is less than 10 seconds, then there is a high likelihood that the response was not as relevant to the requested entry as it should be, leading to a determination of fraudulent activity.

In another aspect of the embodiment, the server 105 can identify the user 102 by a secure token allocated to that device 110. In a further aspect, the secure token can be used by the user 102, who accesses the system 100 through a website or application when they login. The data that the server 105 receives from the user 102 through the website or mobile application is linked to the secure token/identifier. Therefore, an IP address, a phone number, a device token, website usage or mobile application usage can be linked with the secure token for every request made to the server 105 from the user 102.

In another aspect, the server 105 can perform multiple assessments of a request. In a further aspect, a plurality of business rules can be established to define an assessment process. For example, the business rules can define that the multiple assessments be executed in a serial manner. In a further aspect, multiple identifiers in the user profile can be used to complete the assessments. In addition to the identifiers, additional data for the assessments could be provided by the mobile application/website or the $3^{rd}$ party data providers 125 (e.g. MaxMind or Telesign).

In an example embodiment of determining fraudulent activity, a user may submit a request. The processor 105 can send an information request regarding the requester IP address to MaxMind. In response, MaxMind can return IP info for the user. If multiple accounts have that same IP, the processor 105 can determine the existence fraudulent activity. In a further aspect, another $3^{rd}$ party, such as Telesign, can identify the type of phone carrier. If the server determines that the phone carrier is invalid, that phone 110 may be considered fraudulent resulting in the user being treated as a fraudulent user. In another aspect, the assessment can verify the type of device based user device 110 listed in the profile. For example, a user's device 110 is identified as an Android type device by a $3^{rd}$ Party 125, a comparison matching to an Apple device can be determined to be fraudulent activity.

Another example assessment can be a geographic assessment, wherein the evaluation is based on verifying the location by the requester relative to the target segment 103. In particular, if the unique identifier identifies that the telephone number is outside of the geographic location of the requested data, the assessment can request the user 102 to verify that they are in a specific geographic location. In another embodiment, the assessment can comprise a two stage verification process. In particular, the server may identify that the telephone number and/or IP address of a mobile device associated with that mobile device is pinging from, a cell phone tower in Atlanta, Ga. Subsequently, during the second phase of the assessment, the server can identify that the telephone number and/or IP address is pinging from a cell phone tower in Seattle, Wash. The period of time between the subsequent assessments by the server could be set such that a determination could be made whether a situation would be improbable for the mobile device to have realistically traveled the distance between the time period of the two pinging instances by the server to be accurate. For example, the assessment could determine whether it is probable or improbable for the mobile device to travel the distance between Atlanta and Seattle when the time period between successive pings by the server is 10 minutes.

A profile verification assessment can be another type of assessment, wherein the evaluation compares the user's response to a profile related question to the actual data in the user's profile. In a further aspect, if the request has relevance to the age of the target group, the processor can request the age of the member. For example, if a user is an alcoholic beverage company, the user may need to verify the age of the member. Further, there can be a plurality of questions asked in this type of assessment wherein a validated assessment can require a certain number of matching data to meet a validating threshold. For example, the server may ask multiple questions related to the purported age of the user with respect to their profile, such as but not limited to the birth date, $18^{th}$ birthday and/or the $21^{st}$ birthday. In the case of a car rental situation, the $25^{th}$ birthday can be requested. These questions can be asked as a collective group or individually. In the case of a collective group of questions, a passing score can be established to validate a sufficient threshold has been met. Thus, if the profile of a member indicates that he/she is not yet 21, but the member claims to be older than 21 to answer an alcohol related question from the user, then the system can detect fraudulent activity and block the user from proceeding.

Situational awareness information can also be denied to requesters identified as public offenders in a public offender database. Situational awareness information can also be restricted by access rules specified in a security rule database. For example, requesters enrolled in a particular university can only be allowed to obtain situational awareness information about other students enrolled in the university. Many different types of groups can be reflected in enrollment databases used to control situational awareness information, such as corporate employees, church groups, meet-up groups and the like. As another example, the system can also impose security access rules based on the age of the requester and the age of a personal data profile of interest identified in the situational awareness request. Individual members can define, activate and deactivated security rules and permission settings on an as-needed basis giving each member the ability to control the use of their profile data in situational awareness information provided to third-party requesters.

In yet another aspect, the assessment can be a photo analysis assessment. For example, the processor can send a photo request based on previously saved profile data and/or geolocation data. In particular, the member can be requested to respond with a selfie, or a picture of a receipt to verify that the member has performed some action. In response, the user can send the photo to be subsequently verified. In other aspects, instead of a photo, the user 102 can scan a particular document such as a receipt to verify that a transaction was completed or that the user was at a specific venue and/or store. In particular, the user may have recently purchased electronics equipment, and the assessment later requests the user to provide a photo of the receipt or serial, number of the purchased electronic equipment.

Referring back to Decision Block 335, if it is determined that fraudulent activity has occurred, the YES branch can t followed to Block 340. In Block 340, the first device can limit the access to the situational awareness server. In an aspect, the access can be limited by preventing access to the server. In a further aspect, access to the server can be denied through a website or mobile device application. In another aspect, the access can be limited to a particular classification of the members. For example, members who have only provided a minimal amount of information to the situational awareness system. In another aspect, limiting the access can be temporal. Thus, the user can be required to perform an updating action to their profile. At the conclusion of updating the user profile, the user can reinitiate a request to access the system.

Figure 4:
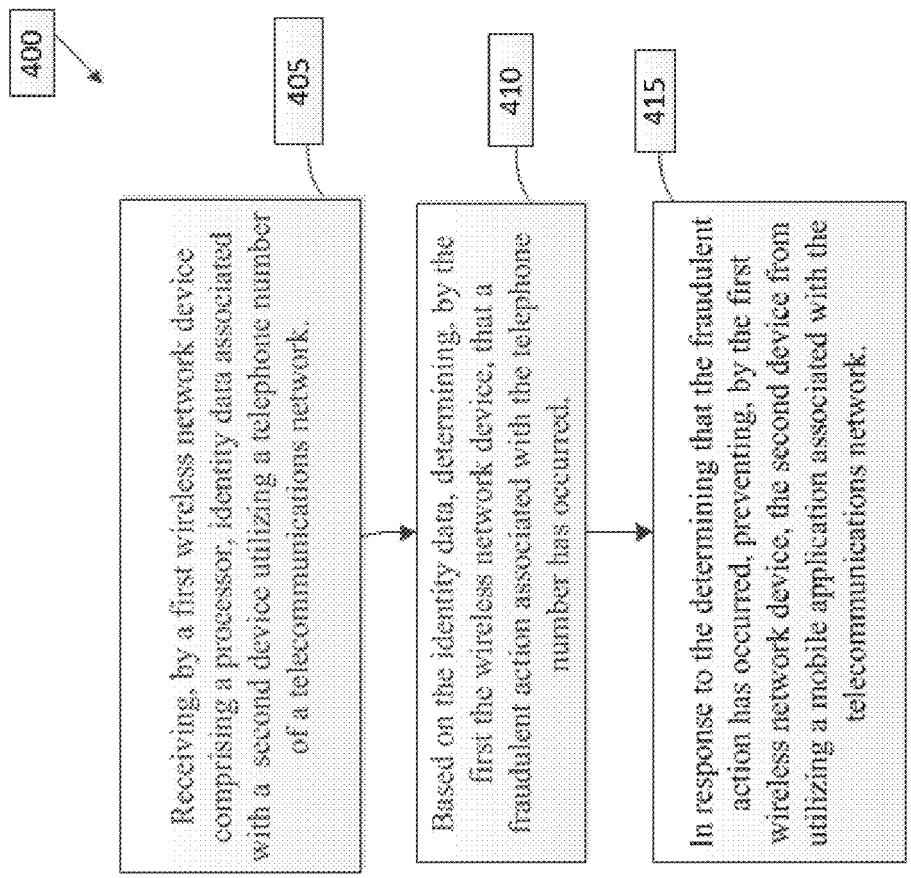
FIG. 4 is an example block diagram of the disclosure for determining access to a situational awareness system.

FIG. 4 is a flowchart representing an example method for providing secure access to the marketing and polling system. The method 400 can begin in block 405, in which a first wireless network device 105 comprising a processor, can receive identity data associated with a second device 110 utilizing a telephone number of a telecommunications network. Block 405 can be followed by Block 410, in which based on the identity data, the first the wireless network device can determine that a fraudulent action associated with the telephone number has occurred. Block 410 can be followed by Block 415, wherein the first wireless network device can prevent the second device from utilizing a mobile application associated with the telecommunications network.

In one embodiment, preventing the second device from utilizing a mobile application can comprise preventing the user device associated with the identity data from creating an account to utilize the mobile application. In a further aspect, the fraudulent action resulting in the preventative measure can comprise utilizing multiple accounts associated with the mobile application. In yet another embodiment, determining that the fraudulent action has occurred can result in a request for response data from the second device. The response data received from the second device can be associated with user identity data associated with a profile. Determining the existence of a fraudulent action can further comprise comparing, by the wireless network device, the response data received from the user device to the data currently in the user profile. The resulting comparison can provide comparison data. Further, in response to comparing the response data, the comparison data can fail to satisfy a condition associated with a match between the identity data and the response data. In another aspect, determining the fraudulent action can be based on a duration of time not being determined to have been satisfied. In yet another aspect, determining the fraudulent action can be based on a text string being determined to be an incoherent text string. In other example embodiments of the disclosure, the method 400 can comprise fewer or greater numbers of operations than those described above, and can be performed in a different sequential order than described above.

Figure 5:
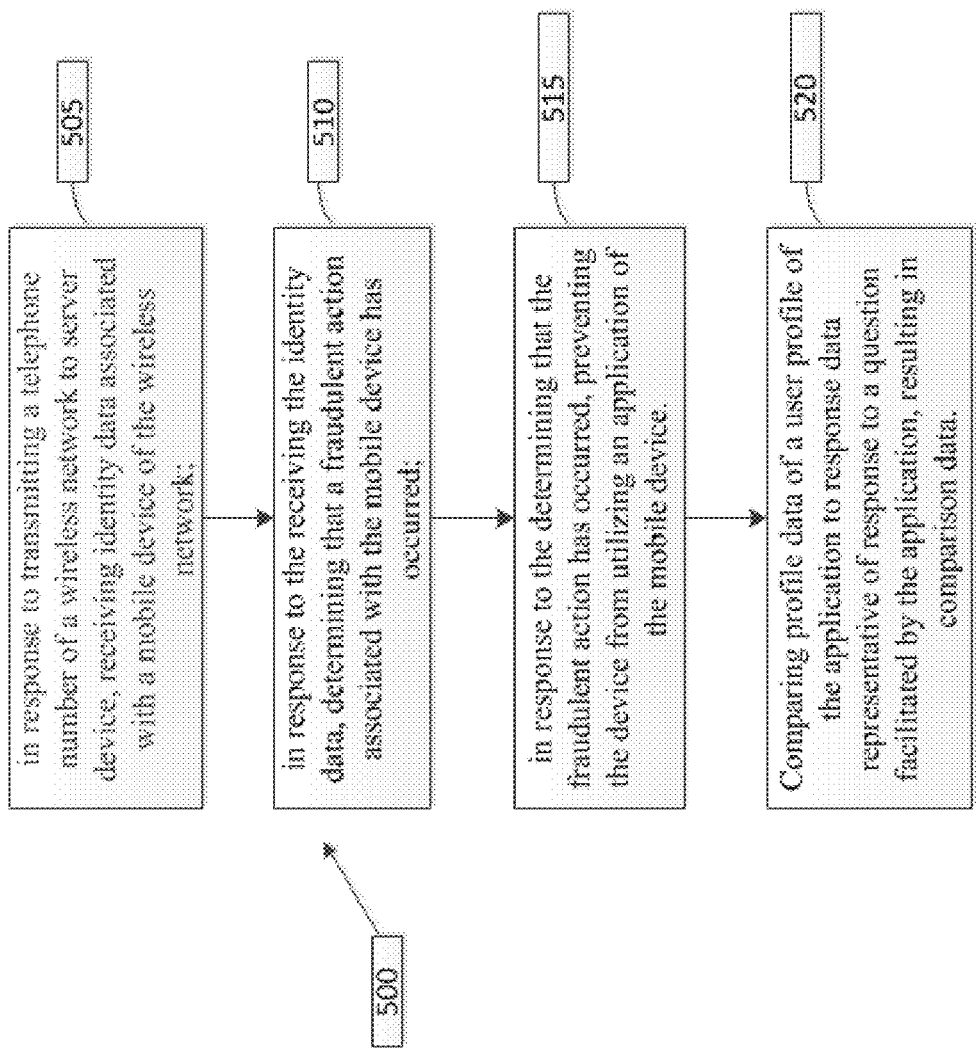
FIG. 5 is an example block diagram of the disclosure for determining access to a situational awareness system.

FIG. 5 is a flowchart representing an example system for providing secure access to the marketing and polling system by a processor and a memory that stores executable instructions that, when executed by the processor, facilitate performance of operations. The system 500 can begin in Block 505, wherein in response to transmitting a telephone number of a wireless network to server device, identity data associated with a mobile device of the wireless network can be received. Block 505 can be followed by Block 510, in response to receiving the identity data, the occurrence of a fraudulent action associated with the mobile device can be determined. Block 510 can be followed by Block 515, wherein in response to the determining that the fraudulent action has occurred, utilization of an application of the mobile device can be prevented. Block 515 can be followed by Block 520, wherein profile data of a user profile of the application can be compared to response data representative of a response to a question facilitated by the application, resulting in comparison data.

In another embodiment, the fraudulent action can comprise utilizing a first user account of the application and utilizing a second user account of the application from the mobile device. In an aspect of the embodiment, the comparison data can be profile data that can comprise age data representative of an age of a user of the application. In another aspect, the profile data can comprise political data representative of a political affiliation of a user of the application. In one embodiment, the comparison of the profile and received data fail to satisfy a condition associated with the matching, resulting in access being denied. In an alternative aspect, the comparison data can satisfy a condition associated with the matching, resulting in access being allowed. In other example embodiments of the disclosure, the method 500 can comprise fewer or greater numbers of operations than those described above and can be performed in a different sequential order than described above.

Figure 6:
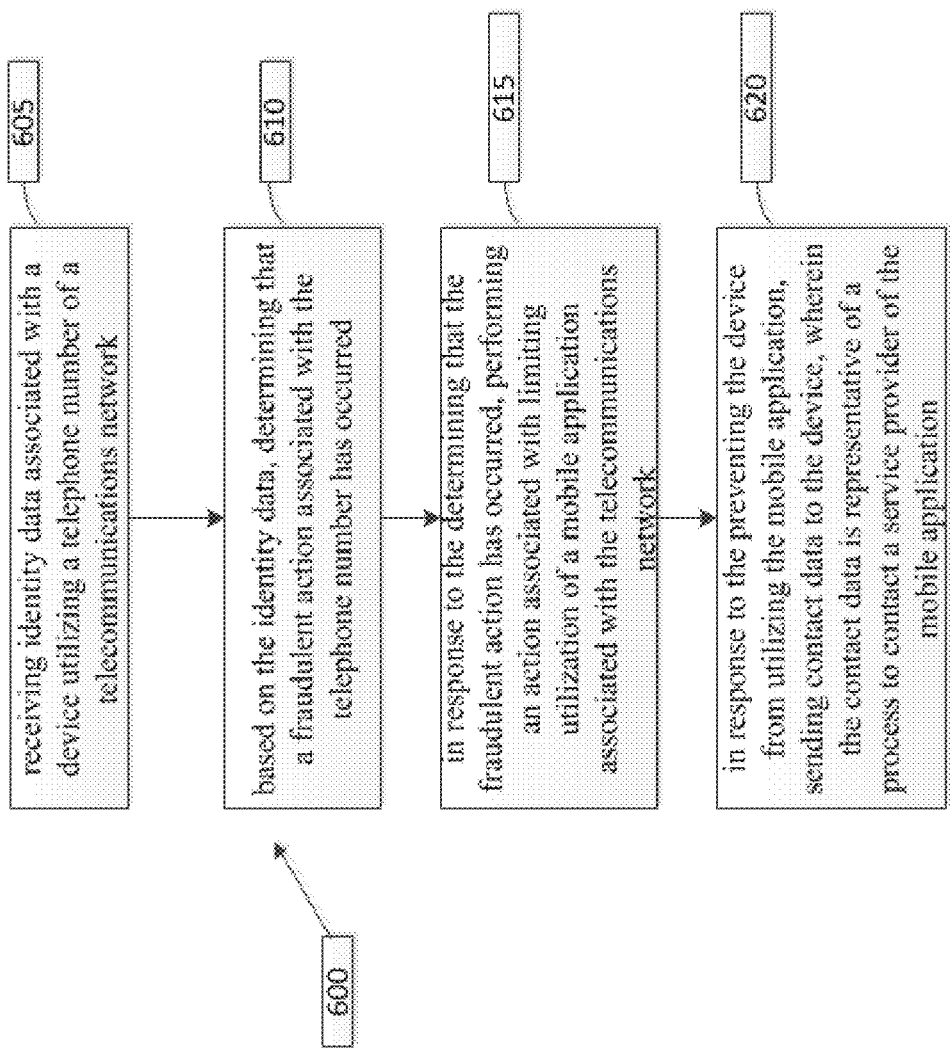
FIG. 6 is an example block diagram of the disclosure for determining access to a situational awareness system.

FIG. 6 is a flowchart representing an example computer-readable medium, for providing secure access to the marketing and polling system, comprising executable instructions that when executed by a processor facilitate performance of operations. The computer-readable medium operating method 600 can begin in Block 605, wherein identity data associated with a device utilizing a telephone number of a telecommunications network can be received. Block 605 can be followed by Block 610, wherein based on the identity data, the occurrence of fraudulent activity associated with the telephone number can be determined. The occurrence of 610 can be followed by Block 615, wherein in response to the determination that the fraudulent action has occurred, a responsive action associated with limiting utilization of a mobile application associated with the telecommunications network can be performed. Block 615 can be followed by Block 620, wherein in response to preventing the device from utilizing the mobile application, sending contact data to the device, wherein the contact data is representative of a process to contact a service provider of the mobile application.

In one embodiment, the responsive action can comprise preventing the device from utilizing the mobile application. In another embodiment, preventing the device from utilizing the mobile application can comprise restricting an account associated with the mobile application. In another aspect, determining that the fraudulent action has occurred can be based on a location associated with the device. In a further aspect, the location can be determined to be an improbable location based on a previous location of the device and a time value for travel between the improbable location and the previous location.

The disclosure is described above with reference to block and flow diagrams of systems, methods, apparatus, and/or computer program products according to example embodiments of the disclosure. It will be understood that one or more blocks of the block diagrams and flow diagrams and combinations of blocks in the block diagrams and flow diagrams, respectively, can be implemented by computer-executable program instructions. Likewise, some blocks of the block diagrams and flow diagrams can not necessarily need to be performed in the order presented, or can not necessarily need to be performed at all, according to some embodiments of the disclosure.

These computer-executable program instructions can be loaded onto a general-purpose computer, a special purpose computer, a processor or other programmable data processing apparatus to produce a particular machine, such that the instructions that execute on the computer, processor or other programmable data processing apparatus create means, for implementing one or more functions specified in the flow diagram block or blocks. These computer program instructions can also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure can provide for a computer program product, comprising a computer usable medium having a computer-readable program code or program instructions embodied therein, said computer-readable program code adapted to be executed to implement one or more functions specified in the flow diagram block or blocks. The computer program instructions can also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing; the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the disclosure has been described in connection with what is presently considered to be the most practical and various embodiments, it is to be understood that the disclosure is not to be limited to the disclosed embodiments, but on the contrary, is intended to cover various modifications and equivalent arrangements comprised within the spirit and scope of the appended claims.

What is claimed is:

1. A method, comprising:
   receiving, by a first network device comprising a processor, identity data associated with a second network device utilizing a telephone number of a telecommunications network, an IP address assigned to the second wireless network device, or a piece of profile data associated with the second wireless network device;
   based on the identity data, determining, by the first network device, that a fraudulent action associated with the second network device has occurred;
   in response to determining that the fraudulent action has occurred, preventing, by the first network device, the second network device from utilizing a mobile application associated with the first network device;
   wherein the determination that the fraudulent action has occurred is based on a determination that a text string received from the second network device is incoherent.

2. The method of claim 1, wherein preventing the second network device from utilizing a mobile application associated with the first network device comprises preventing the second network device from creating an account to utilize the mobile application.

3. The method of claim 1, wherein the determination that the fraudulent action has occurred comprises a determination that the second network device has utilized multiple accounts associated with the mobile application.

4. The method of claim 1, wherein the determination that the fraudulent action has occurred, further comprises:
   requesting response data from the second network device relating to a user profile associated with the second network device; and
   comparing, by the first network device, the response data received from the second network device to the user profile associated with the second network device.

5. The method of claim 4, wherein the determination that the fraudulent action has occurred comprises a determination that the response data received from the second network device does not match the user profile associated with the second network device.

6. The method of claim 1, wherein the determination that the fraudulent action has occurred is based on a determination that a duration of time has not been satisfied.

7. A situational awareness system operative to provide access to situational awareness information comprising real-time location data received from location reporting mobile communication devices associated with participants of the situational awareness system, personal data obtained from user profiles associated with the participants, and statistics based on the real-time location data and the personal data, comprising:
   a processor; and
   a memory that stores executable instructions that, when executed by the processor, facilitate performance of operations, comprising:
      receiving a request for access to the situational awareness system from a requesting device;
      receiving identity data associated with the requesting device;
      applying security access rules to one or more of location data received from the requesting device, the identity data associated with the requesting device, and information received from a user of the requesting device;
      based on the application of the security analysis rules, determining that a fraudulent action associated with the requesting device has occurred; and
      in response to determining that the fraudulent action has occurred, preventing the requesting device from accessing the situational awareness system.

8. The system of claim 7, further comprising:
   determining whether the requesting device has utilized multiple user accounts of the situational awareness system;
   wherein the security access rules comprise preventing the requesting device from accessing if the requesting device has utilized multiple user accounts of the situational awareness system.

9. The system of claim 7, further comprising:
   transmitting a security question to the requesting device;
   receiving a response to the security question from the requesting device;
   conducting a security question comparison between profile data of a user profile associated with the requesting device and the response received from requesting device;
   wherein the security access rules comprise preventing the requesting device from accessing the situational awareness system based on the security question comparison.

10. The system of claim 7, further comprising:
receiving a real-time location data for the requesting device;
receiving a user profile associated with the requesting device comprising profile location data;
conducting a location comparison between the real-time location of the requesting device and the profile location data;
wherein the security access rules comprise preventing the requesting device from accessing the situational awareness system based on the location comparison.

11. The system of claim 7, further comprising:
receiving a selfie photo from the requesting device;
receiving a user profile associated with the requesting device comprising a profile photo;
conducting a photo comparison between the selfie photo received and the profile photo;
wherein the security access rules comprise preventing the requesting device from accessing the situational awareness system based on the photo comparison.

12. The system of claim 7, further comprising:
receiving a user profile associated with the requesting device comprising age data;
wherein the security access rules comprise preventing the requesting device from accessing the situational awareness system based on the age data.

13. The system of claim 7, further comprising:
receiving a user profile associated with the requesting device comprising a political affiliation data;
wherein the security access rules comprise preventing the requesting device from accessing the situational awareness system based on the political affiliation data.

14. A computer-readable storage medium, comprising non-transitory executable instructions that, when executed by a processor, facilitate performance of operations, comprising:
receiving location data associated with a device requesting access to a mobile application
based on the location data, determining that a fraudulent action associated with the requesting device has occurred;
in response to determining that the fraudulent action has occurred, performing a responsive action associated with limiting utilization of the mobile application by the requesting device;
wherein the determination that the fraudulent action has occurred is based on a determination that the location data associated with the requesting device is an improbable location based on a previous location of the requesting device and a time value for travel between the improbable location and the previous location.

15. The computer-readable storage medium of claim 14, wherein the responsive action comprises preventing the requesting device from utilizing the mobile application.

16. The computer-readable storage medium of claim 14, further comprising:
sending contact data to the requesting device for contacting a service provider of the mobile application.

17. The computer-readable storage medium of claim 14, wherein preventing the requesting device from utilizing the mobile application comprises restricting an account associated with the requesting device.

18. The computer-readable storage medium of claim 14, wherein determining that the fraudulent action has occurred is also based on profile data associated with the requesting device.

19. The system of claim 7, further comprising:
determining that the requesting device is not associated with a particular group enrollment;
wherein the security access rules comprise preventing the requesting device from accessing the situational awareness system because the requesting device is not associated with the particular group enrollment.

20. The system of claim 7, further comprising:
receiving biometric data from the requesting device;
receiving a user profile associated with the requesting device comprising profile biometric data;
conducting a biometric data comparison between the received biometric data and the profile biometric data;
wherein the security access rules comprise preventing the requesting device from accessing the situational awareness system based on the biometric data comparison.

* * * * *